UNITED STATES PATENT OFFICE.

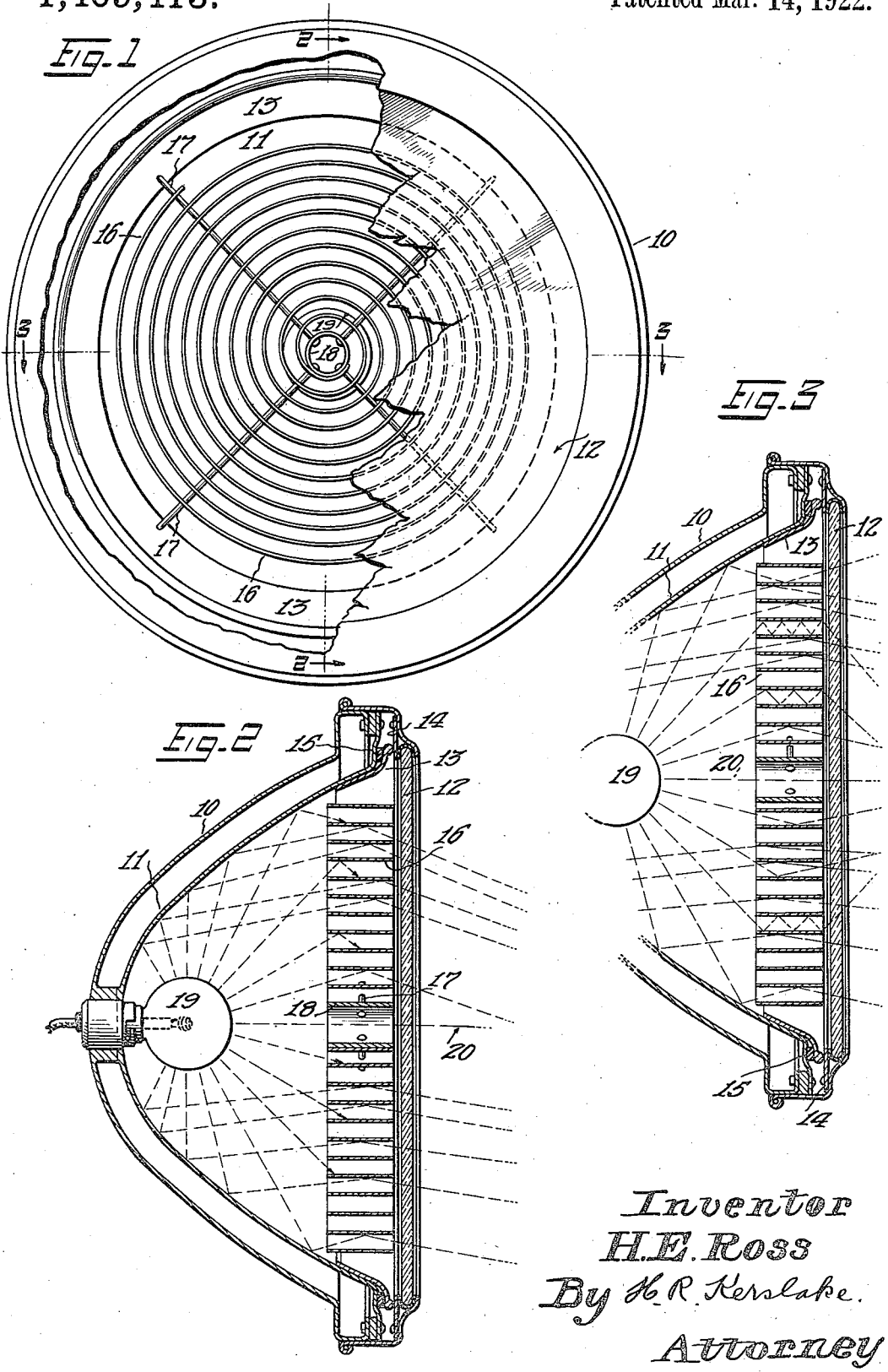

HERBERT ERNEST ROSS, OF SYDNEY, NEW SOUTH WALES, AUSTRALIA.

GLARE-PREVENTING ATTACHMENT FOR PROJECTOR LAMPS.

1,409,413.     Specification of Letters Patent.     Patented Mar. 14, 1922.

Application filed January 7, 1920. Serial No. 349,936.

*To all whom it may concern:*

Be it known that I, HERBERT ERNEST ROSS, Equitable Building, George Street, Sydney, New South Wales, Australia, subject of the King of Great Britain and Ireland, have invented certain new and useful Improvements in Glare-Preventing Attachments for Projector Lamps, of which the following is a specification.

The object of this invention is to control the rays of light projected from an automobile headlight or spot light so as to prevent "glare" effects liable to inconvenience approaching traffic. The utility of the invention is not limited to automobile head lamps, though it is hereinafter described as applied to those lamps.

It is desirable for the safety of oppositely moving traffic to cut off or to minimize the intensity of all rays which reach the eye of an approaching observer, that is to say practically all rays directed above about four feet from the ground, and to screen the view of the reflector surface from the eyes of persons approaching the lamp. Lateral and downcast rays necessary for the illumination of the roadway immediately about the car and concentrated searchlight or spotlight beams, must be maintained.

The present invention belongs to that type of lamp glare preventing devices in which the direct and the reflected light rays traverse a slat or louvre screen in the lamp front, which is intended to shield the eyes of approaching persons from a direct view of the light source and of the surface of the light reflector. The desirable condition to be attained is to utilize as nearly as possible the whole of the luminous value of the available light by permitting such of the rays as are projected direct ahead or approximately parallel with the axis of the reflector to pass out of the lamp without suffering reflection or screening; to reflect upwardly directed rays downward, and to shield the vision of persons looking towards the lamp (unless they be located in the path of the direct ahead low searchlight beam) from direct view of the source of light and of the reflecting surfaces. The means required for producing these effects must be permanently operative and practically efficient whether the source of illumination be correctly focussed, and thereby produces a direct ahead beam of maximum intensity, or is incorrectly focussed, and thereby causes dispersal of a disproportionate part of the available light in angularly disposed rays.

The device in which the present invention consists is a grille of spirally or concentrically arranged slats fitted in the lamp face. The grille is composed of curved slats of thin sheet metal arranged edgewise to the reflector axis as concentric rings or as a continuous spiral, with their upper aspect surfaces dulled or darkened to prevent light reflection therefrom, and their underneath and lateral aspect surfaces polished to function as reflectors.

In the accompanying drawing, Fig. 1 is a frontal elevation of an automobile lamp fitted with a face grille according to the present invention; Fig. 2 is a vertical longitudinal section on the plane 2—2 Fig. 1, showing in dotted lines the direction of the vertically disposed rays within the lamp and grille and outside the grille; and Fig. 3 is a horizontal section on the plane 3—3 Fig. 1 showing in dotted lines the direction of the horizontally disposed rays within the lamp and grille and outside the grille.

10 is the lamp case, 11 a parabolic reflector mounted therein, 12 the lamp front glass, 13 a bezel or carrier ring clamped between the lamp front back-ring 14 and the flanged rim of the reflector 11, 15 a resilient packing ring, 16 a spiral coil of thin sheet metal ribbon or hoop, 17 radially disposed rods or spokes fixed at the outer ends in the bezel 13 and at the inner ends in a hub ring 18, and threaded through holes in the coil convolutions so as to fix the same in symmetric relation. 19 is an electric lamp or other source of light at the focus of the reflector 11. The hub ring is not structurally or functionally necessary. It may be omitted.

The upper aspect surfaces of the coil convolutions 16—that is the surfaces which would be seen by a person looking downwardly towards the lamp front from a point forward of it—are oxidized or otherwise darkened and so rendered non-reflective. The lower aspect surfaces and the lateral aspect surfaces of the coil convolutions 16—that is the surfaces which would be seen by a person looking towards the lamp front from any point forward of the lamp below the lens axis are polished and so rendered reflective. The polished surfaces may be graduated into the dulled surfaces, or there may be an abrupt line of demarcation between them, so long as always those surfaces are not polished from which rays would be reflected in a direction liable to cause glare to affect drivers or pedestrians approaching on any part of the same roadway.

It will be understood that the spiral disposition of the ribbon or hoop which forms the grille is not necessary so long as a concentric arrangement is preserved; so that, for instance, the grille might be a nest of concentrically disposed circular rings mounted on the spokes 17. Nor is it necessary that any definite number of spokes be used or that the spoke method of mounting the grille be used. It is only essential that the rings or convolutions be securely fixed in concentric arrangement. The grille may be located either forward of the lamp front glass, or behind it as shown in the drawings, and any convenient structural arrangement for supporting the grille in or on the lamp front may be used, the particular mechanical arrangement illustrated being, however, a convenient one.

The rays which are axially parallel or substantially so, on leaving the lamp 19 or the surface 11, pass direct through the clearance spaces in the grille with negligible loss. The vertically disposed divergent and convergent rays are absorbed when they strike the dulled surfaces of the grille convolutions, and are reflected when they strike its polished surfaces. Similarly, the convergent and divergent rays which are laterally disposed are reflected from the polished lateral surfaces of the grille convolutions. In Figs. 2 and 3 the absorbed rays are indicated by the dotted lines which terminate on the grille surfaces, and the reflected rays are indicated by the dotted lines which extend forward of the grille. The substantially parallel rays which constitute the "search light" or "spotlight" beam are not indicated, except at the centre where the axial beam is indicated at 20.

What I claim as my invention and desire to secure by Letters Patent is:

1. A glare preventing attachment for a projector lamp having a parabolic reflector, including a cell adapted to be fixed in front of the parabolic reflector and constructed of curved sheet metal slats disposed substantially concentrically around the axis of the reflector to form an annular grille with substantially circular clearance spaces therein arranged substantially parallel with said axis, the upper aspects of the surfaces of said slats being approximately one-fourth of the peripheral length thereof and being nonreflective, and the lateral and lower aspects of the surface of said slats being approximately three-fourths of the peripheral length thereof and being reflective.

2. A glare preventing attachment for a projector lamp having a parabolic reflector including a cell adapted to be fixed in front of the parabolic reflector and constructed of a sheet metal ribbon spirally curled with substantially annular light rays clearance spaces between its convolutions, the upper aspects of the surfaces of the convolutions of said ribbon being approximately one-fourth of the peripheral length thereof and being nonreflective and the lateral and lower aspects of the surfaces of said convolutions being approximately three-fourths of the peripheral length thereof and being reflective.

In testimony whereof I affix my signature.

HERBERT ERNEST ROSS.